(12) United States Patent
Mazumdar

(10) Patent No.: US 8,847,524 B2
(45) Date of Patent: Sep. 30, 2014

(54) DISSIPATION OF THE BRAKING ENERGY OF ELECTRICALLY POWERED MINING EQUIPMENT BY LIQUID-COOLED BRAKING RESISTORS

(75) Inventor: Joy Mazumdar, Norcross, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 362 days.

(21) Appl. No.: 13/248,527

(22) Filed: Sep. 29, 2011

(65) Prior Publication Data
US 2013/0082045 A1    Apr. 4, 2013

(51) Int. Cl.
*H02P 3/14*    (2006.01)

(52) U.S. Cl.
USPC ........... 318/376; 318/375; 318/362; 318/364; 105/35; 105/50

(58) Field of Classification Search
USPC ............ 318/362, 364, 375, 376, 380; 105/35, 105/50
See application file for complete search history.

(56) References Cited

U.S. PATENT DOCUMENTS

| | | | | |
|---|---|---|---|---|
| 2,215,296 | A | * | 9/1940 | Ogden ............................. 290/14 |
| 2,245,092 | A | | 6/1941 | McNairy et al. |
| 2,276,807 | A | * | 3/1942 | Tritle et al. .................... 318/364 |
| 2,339,185 | A | | 1/1944 | Nettel |
| 2,633,541 | A | * | 3/1953 | Justus ............................... 290/9 |
| 5,291,960 | A | * | 3/1994 | Brandenburg et al. .... 180/65.27 |
| 6,591,758 | B2 | * | 7/2003 | Kumar ............................. 105/35 |
| 6,973,880 | B2 | * | 12/2005 | Kumar ............................. 105/35 |
| 7,044,096 | B2 | | 5/2006 | Foesel et al. |
| 7,106,016 | B2 | * | 9/2006 | Jackson ........................ 318/380 |
| 7,109,686 | B2 | | 9/2006 | Schulte et al. |

(Continued)

FOREIGN PATENT DOCUMENTS

DE    2710766 A1    9/1978

OTHER PUBLICATIONS

PCT International Search Report mailed Oct. 24, 2013 corresponding to PCT International Application No. PCT/US2012/057488 filed Sep. 27, 2012 (10 pages).

(Continued)

*Primary Examiner* — Paul Ip

(57) ABSTRACT

Braking current generated by an electrical motor on mining equipment during a retard interval is switched through one or more grid resistors that are liquid cooled. Under low ambient temperatures, a heating current can be switched through the grid resistors when the electrical motor is not operating in a retard interval. An integrated cooling system can be used to cool grid resistors and power modules. Heat dissipated by the grid resistors and the power modules can be circulated through auxiliary heating loops to heat portions of the mining equipment under low ambient temperatures. Multiple liquid-cooled power modules, liquid-cooled grid resistors, auxiliary heating loops, control modules, radiators, and pumps can be coupled by a liquid distribution system with various combinations of parallel and serial branches. Temperature, pressure, and flow rate in each branch can be independently controlled. Operation of the integrated cooling system can be controlled by a computational system.

13 Claims, 12 Drawing Sheets

(56) References Cited

U.S. PATENT DOCUMENTS

| | | | |
|---|---|---|---|
| 7,126,299 B2* | 10/2006 | Jackson | 318/380 |
| 7,185,591 B2* | 3/2007 | Kumar et al. | 105/35 |
| 7,325,498 B2* | 2/2008 | Kumar et al. | 105/35 |
| 2004/0149160 A1 | 8/2004 | Fossel et al. | |
| 2005/0005814 A1* | 1/2005 | Kumar et al. | 105/35 |
| 2005/0024002 A1* | 2/2005 | Jackson | 318/375 |
| 2005/0040780 A1* | 2/2005 | Jackson | 318/380 |
| 2007/0144398 A1* | 6/2007 | Kumar et al. | 105/50 |
| 2007/0144800 A1 | 6/2007 | Stone | |
| 2007/0145918 A1* | 6/2007 | Kumar et al. | 318/139 |
| 2007/0272116 A1 | 11/2007 | Bartley et al. | |
| 2008/0174174 A1 | 7/2008 | Burns et al. | |
| 2008/0315805 A1* | 12/2008 | Kumar et al. | 318/362 |
| 2008/0315806 A1* | 12/2008 | Kumar et al. | 318/375 |
| 2010/0090625 A1 | 4/2010 | Nagashima et al. | |
| 2011/0048827 A1 | 3/2011 | Cherney et al. | |
| 2012/0043810 A1* | 2/2012 | Marchand et al. | 307/10.1 |

OTHER PUBLICATIONS

REO-USA, Inc. "Braking Resistor Guide". Downloaded on Jun. 23, 2011 from http://www.reo-usa.com/Tech_Docs/Application_Notes/Braking%20Resistor%20Guide.pdf.

REO Inductive Components AG, "Dynamic Braking Resistors including water-cooled versions". Downloaded on Jun. 23, 2011 from http://www.reo.co.uk/files/dynamic_braking_resistors_02-08_engl.pdf.

Bonne W. Posma, "220 kW Traction Drive for Fuel Cell and Diesel Electric Vehicles", Presented at the SAE HEV Market TOPTEC: Challenges and Opportunities for Trucks, Buses and Cars, Jun. 26-27, 2002, Fort Myers, Florida.

Gerhard Pahlke, "Liquid-cooled High-power Brake Resistors for Fuel Cell and Hybrid Automotive 5 kW to 150 kW", J. Asian Electric Vehicles, vol. 6, No. 1, pp. 1117-1118, Jun. 2008.

\* cited by examiner

DISSIPATION OF THE BRAKING ENERGY OF ELECTRICALLY POWERED MINING EQUIPMENT BY LIQUID-COOLED BRAKING RESISTORS

BACKGROUND OF THE INVENTION

The present invention relates generally to electrically powered mining equipment, and more particularly to the dissipation of the braking energy of electrically powered mining equipment by liquid-cooled braking resistors.

Vehicles used in the mining industry, such as mining haul trucks, electric shovels, and draglines, are often driven by high-powered electrical motors. In some applications, electrical power is supplied to the electrical motors from an external power station via a feed cable or trolley line. In other applications, electrical power is supplied to the electrical motors from a generator on board the vehicle; the generator can be driven, for example, by a diesel engine.

When an electrical motor is operating in the drive mode, it converts electrical energy into mechanical energy. When a moving vehicle slows down, however, the electrical motor operates in a reverse mode, converting mechanical energy into electrical energy. This electrical energy is typically dissipated as waste heat in braking resistors. The braking resistors, in turn, need to be cooled to avoid exceeding their service temperature.

In existing mining vehicles, the braking resistors are air cooled by fans. There are several disadvantages to air cooling. The overall assembly for the braking resistors occupies substantial volume: large braking resistors are needed to dissipate the required power; large spacings between braking resistors are needed to allow adequate air flow; and large, high-speed fans are needed to provide adequate cooling power. The volume of the assembly for the air-cooled braking resistors decreases the available cabin space for the operator of the vehicle and decreases the available payload for mining haul trucks. The fans, furthermore, generate high noise levels, which pose a potential safety hazard for the operator.

BRIEF SUMMARY OF THE INVENTION

An electrical motor on mining equipment operates in at least one propel interval and in at least one retard interval. Braking current that is generated by the electrical motor during a retard interval is switched through one or more braking resistors. Heated generated by the braking resistors is transferred to a cooling liquid.

Mining equipment can operate under ambient temperatures lower than the low service temperature limit of a liquid-cooled braking resistor. In an embodiment, the operating state of the electrical motor and the ambient temperature are monitored. If the electrical motor is not operating in a retard interval, and if the ambient temperature is less than a predetermined low-temperature limit, a heating current is switched through the braking resistor.

In an embodiment, an integrated cooling system is used to transfer heat from both power modules and braking resistors. The cooling liquid is circulated through auxiliary heating bops to heat portions of the mining equipment under low ambient temperatures.

In an embodiment, multiple liquid-cooled power modules, liquid-cooled braking resistors, auxiliary heating loops, control modules, radiators, and pumps are coupled by a liquid distribution system with various combinations of parallel and serial branches. Temperature, pressure, and flow rate in each branch are independently controlled. In an embodiment, operation of the integrated cooling system is controlled by a computational system.

These and other advantages of the invention will be apparent to those of ordinary skill in the art by reference to the following detailed description and the accompanying drawings.

DETAILED DESCRIPTION

In the description below, a mining haul truck is used as an example of electrically powered mining equipment. One skilled in the art, however, can develop embodiments of the invention for other electrically powered mining vehicles, such as electric shovels and draglines, and for non-mobile electrically powered mining equipment, such as mills and conveyor systems.

Figure 1:
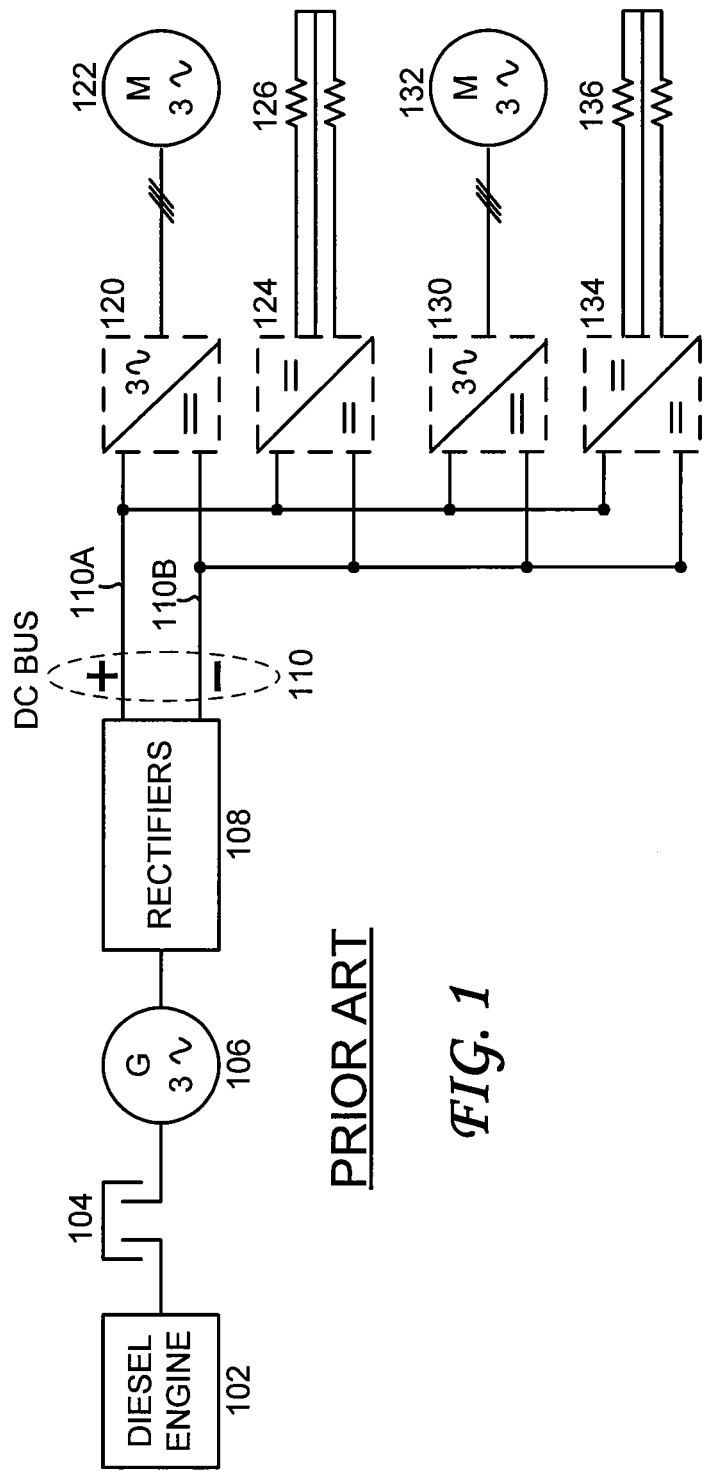
FIG. 1 shows a single-line diagram of a prior-art diesel-powered electrical power system for a mining haul truck.

FIG. 1 shows a single-line diagram of a mining haul truck power system. The mining haul truck has two drive wheels. In the drive mode (also referred to as the propel mode), each wheel is driven by a 3-phase alternating-current (AC) wheel motor (M). The wheel motors are referenced as the wheel motor 122 and the wheel motor 132. Electrical power is supplied by the diesel engine 102 driving the 3-phase AC generator (G) 106. Other types of mechanical engines can be used; diesel engines are typical in mining operations. The coupling 104 couples the diesel engine 102 to the generator 106. The diesel engine 102 and the generator 106 are mounted on the mining haul truck. The AC output of the generator 106 is fed into the rectifiers 108. The direct current (DC) output of the rectifiers 108 is fed into the DC bus 110 with a positive rail 110A and a negative rail 110B. For mining vehicles, the nominal voltage across the DC bus 110 is about 1800-2100 VDC. The inverters 120 draw DC power from the DC bus 110 and supply 3-phase AC power to the wheel motor 122. Similarly, the inverters 130 draw power from the DC bus 110 and supply 3-phase AC power to the wheel motor 132.

To slow down a moving mining haul truck, the mining haul truck drive system operates in the retard mode (also referred to as the braking mode). Under normal operation, an electrical motor converts electrical energy into mechanical energy. An electrical motor can also be operated in reverse as a generator to convert mechanical energy into electrical energy. The electrical energy is then fed into inverters. Braking choppers, connected to the inverters, channel the power into a power resistor grid that continuously dissipates the energy until the mining haul truck reaches standstill. Braking is smooth, without mechanical brake wear.

Referring to FIG. 1, the braking chopper 124 and the power resistor grid 126 provide the braking action for the wheel motor 122. Similarly, the braking chopper 134 and the power resistor grid 136 provide the braking action for the wheel motor 132. The mining haul truck is also outfitted with a mechanical braking system as a backup to the electrical braking system.

Figure 2:
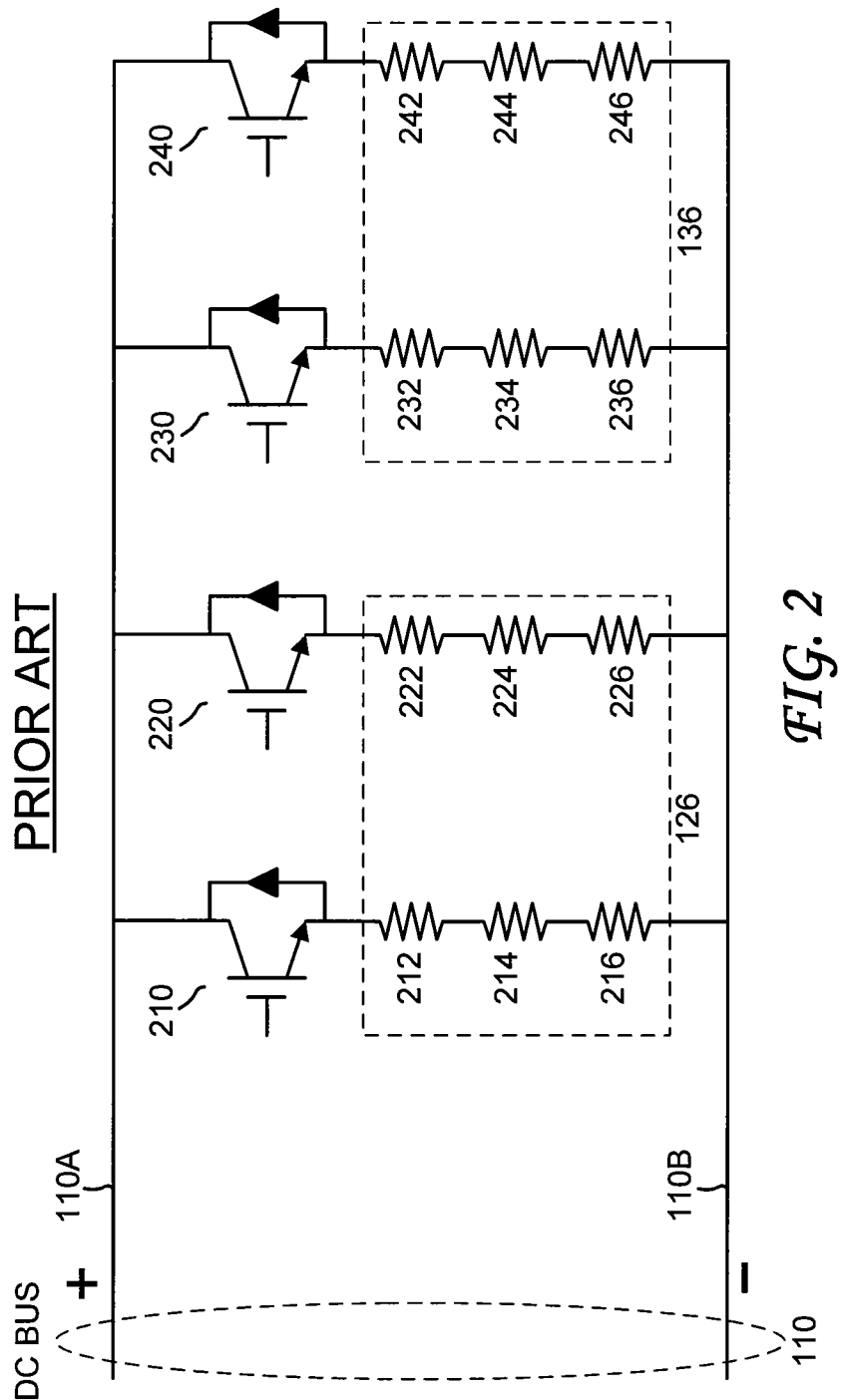
FIG. 2 shows a schematic of a prior-art power resistor grid circuit.

FIG. 2 shows a more detailed electrical schematic of the power resistor grids. In this example, there are four DC choppers. A DC chopper can be implemented, for example, with an insulated-gate bipolar transistor (IGBT). Each DC chopper is connected to a series of three grid resistors (R). Herein, a grid resistor is also referred to as a braking resistor. DC chopper 210 is connected to R 212, R 214, and R 216; DC chopper 220 is connected to R 222, R 224, and R 226; DC chopper 230 is connected to R 232, R 234, and R 236; and DC chopper 240 is connected to R 242, R 244, and R 246. The power resistor grid 126 in FIG. 1 corresponds to R 212, R 214, R 216, R 222, R 224, and R 226. The power resistor grid 136 in FIG. 1 corresponds to R 232, R 234, R 236, R 242, R 244, and R 246. In general, the number of DC choppers, the number of resistors in series with each DC chopper, the resistance value of each resistor, the power rating of each DC chopper, and the power rating of each resistor are user-defined values that depend on various design parameters such as the amount of regeneration power and the mining haul truck payload.

Figure 3:
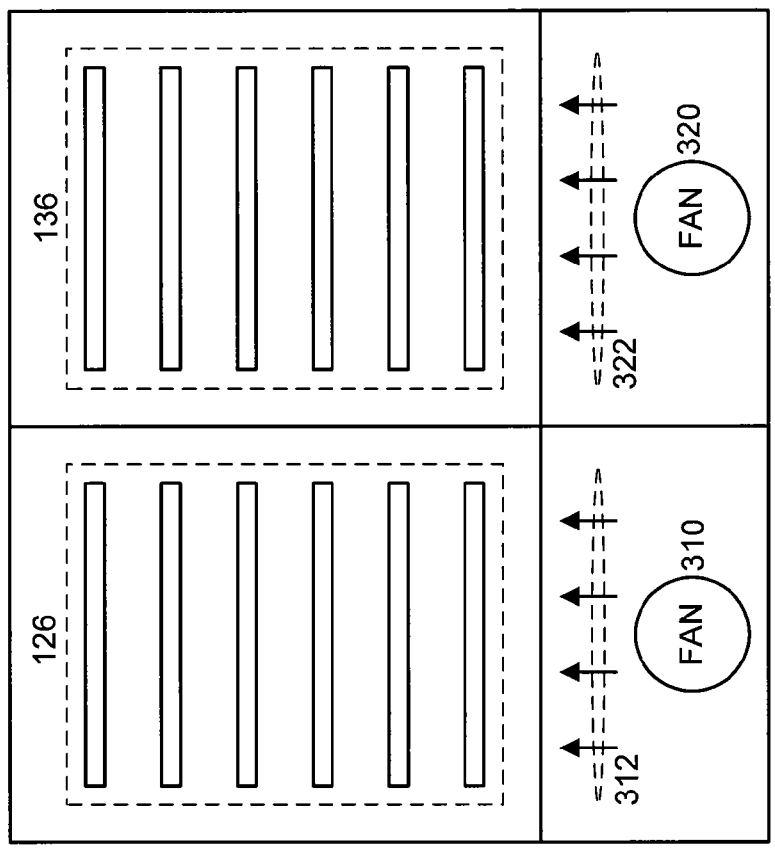
FIG. 3 shows a schematic of a prior-art air cooling system for grid resistors.

In the retard mode, electrical energy is dissipated by the power resistor grids as waste heat. The waste heat must be removed in order to avoid overheating the power resistor grids. FIG. 3 shows a mechanical schematic of a prior-art air-cooled power resistor grid system 300. The grid resistors are housed in an enclosure referred to as the grid box. The grid resistors are configured in two banks: the six grid resistors in the power resistor grid 126 are included in the first bank, and the six grid resistors in the power resistor grid 136 are included in the second bank. The power resistor grid 126 is cooled by the fan 310; and the power resistor grid 136 is cooled by the fan 320. The airflow of the cooling air 312 at the output of the fan 310 is approximately equal to the airflow of the cooling air 322 at the output of the fan 320. To provide adequate cooling, the sizes of the grid box and the fans need to be large, and the payload capacity of the mining haul truck is reduced. The fans also generate high levels of noise, which pose a potential safety hazard to the operator of the mining haul truck.

Figure 4:
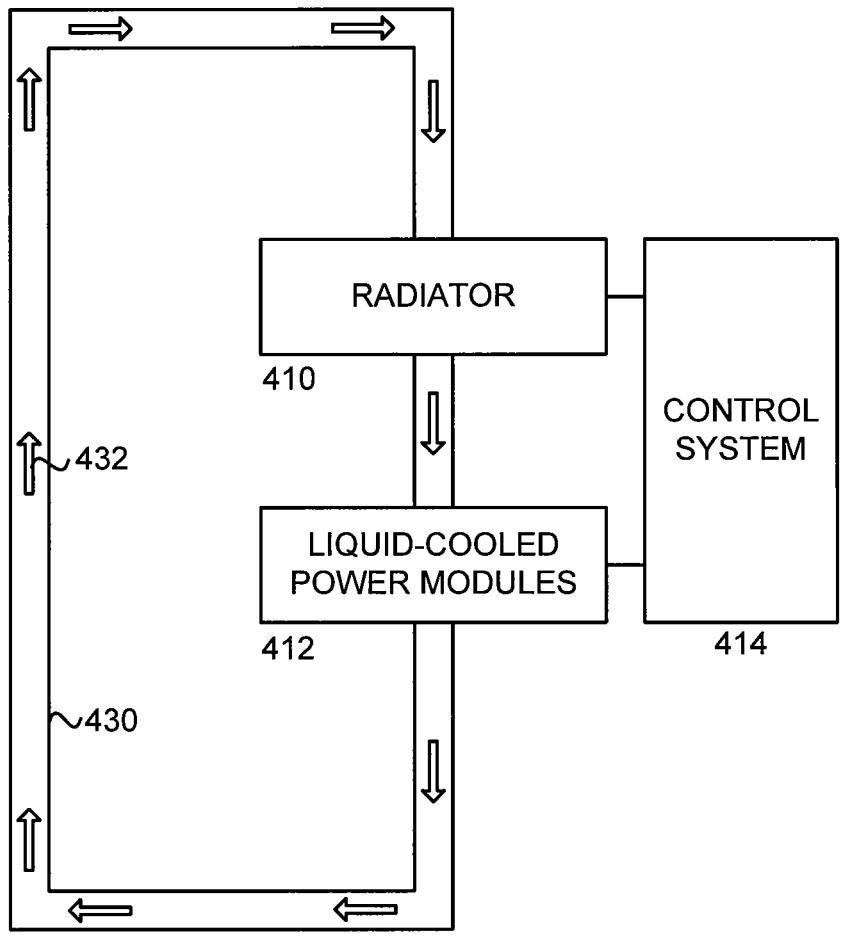
FIG. 4 shows a schematic of a prior-art liquid cooling system for power modules.

The inverters 120 and the inverters 130 (FIG. 1) are air cooled for mining haul trucks weighing about 240 tons and less. For heavier mining haul trucks, weighing from about 280 tons to about 400 tons, the inverters 120 and the inverters 130 are contained in liquid-cooled power modules. FIG. 4 shows a schematic of a liquid-cooled power module system 400. The cooling liquid 432 circulates through the closed-cycle liquid distribution system 430. The cooling liquid 432 is typically water or a water-glycol mixture. The cooling liquid 432 flows through the liquid-cooled power modules 412. The cooling liquid 432 is heated by heat dissipated by the liquid-cooled power modules 412. A liquid pump (not shown) circulates the heated cooling liquid 432 through the radiator 410. The radiator 410 is cooled by an air exchanger (not shown), which equalizes the temperature of the cooling liquid 432 with the ambient temperature. Various sensors (not shown) monitor the state of the cooling liquid 432, and the operation of the liquid-cooled power module system 400 is controlled by the control system 414. Typically, the radiator 410, the liquid-cooled power modules 412, and the control system 414 are mounted in an integrated unit referred to as an inverter skid.

Figure 5:
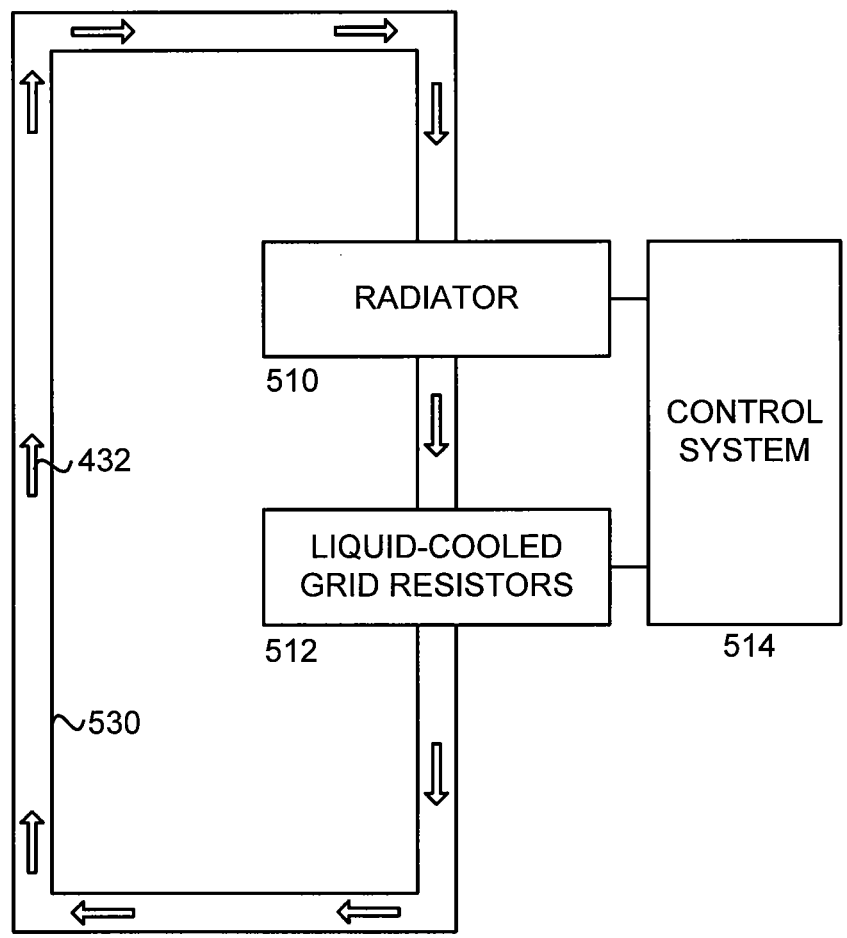
FIG. 5 shows a schematic of an embodiment of a liquid cooling system for grid resistors.

In an embodiment of the invention, grid resistors are liquid cooled instead of air cooled. FIG. 5 shows a schematic of a liquid-cooled grid resistor system 500. The cooling liquid 432 circulates through the closed-cycle liquid distribution system 530. The cooling liquid 432 flows through the liquid-cooled grid resistors 512. The cooling liquid 432 is heated by heat dissipated by the liquid-cooled grid resistors 512. The heated cooling liquid 432 is then circulated to the radiator 510, in which heat is dissipated from the cooling liquid 432. The operation of the liquid-cooled grid resistor system 500 is controlled by the control system 514.

The liquid-cooled grid resistor system 500 is independent of the liquid-cooled power module system 400 previously shown in FIG. 4. For mining haul trucks with air-cooled power modules, a stand-alone liquid-cooled grid resistor system 500 can be used. For a mining haul truck with a liquid-cooled power module system 400, a separate liquid-cooled grid resistor system 500 can also be used. In an embodiment, however, an integrated cooling system is used for both the liquid-cooled power modules and the liquid-cooled grid resistors.

Figure 6:
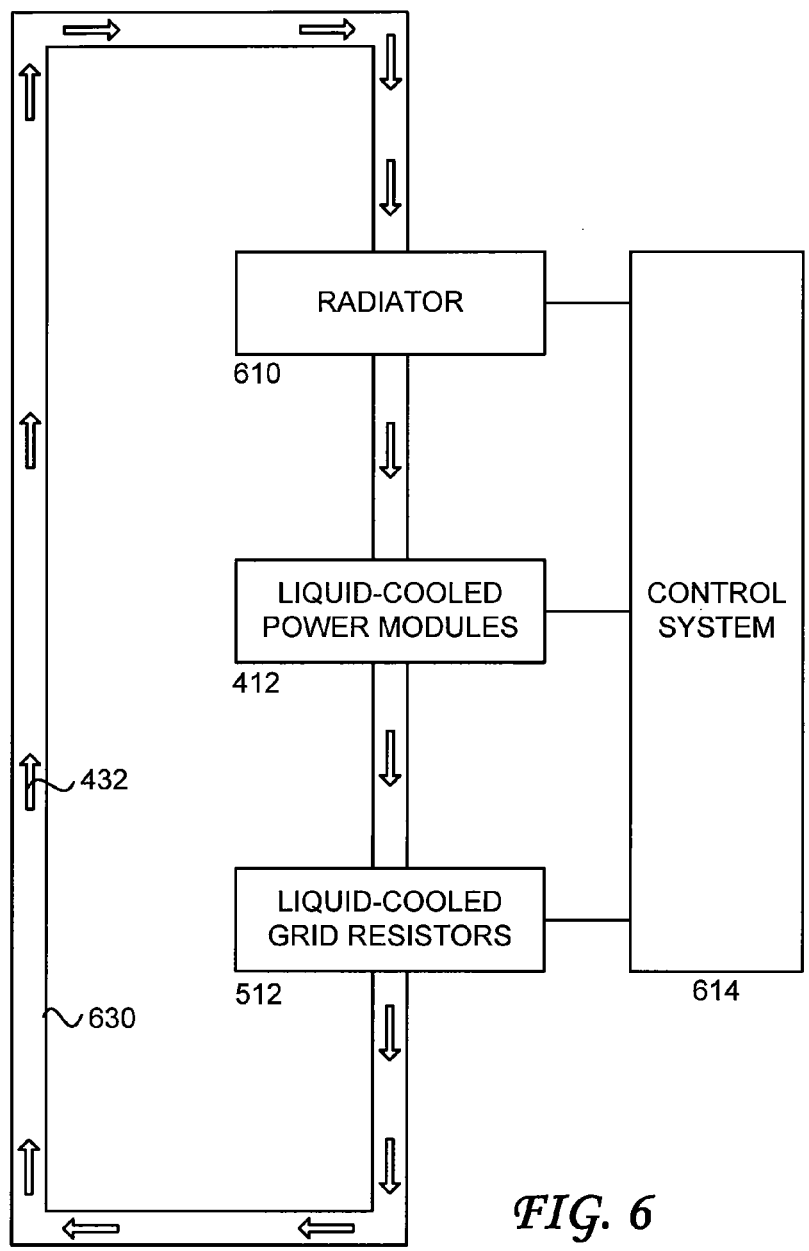
FIG. 6 shows a schematic of one embodiment of an integrated liquid cooling system for power modules and grid resistors.

FIG. 6 shows a schematic of an integrated cooling system 600 for both the liquid-cooled power modules and the liquid-cooled grid resistors. The cooling liquid 432 circulates through the closed-cycle liquid distribution system 630. The cooling liquid 432 flows through the liquid-cooled power modules 412. The cooling liquid 432 is heated by heat dissipated by the liquid-cooled power modules 412. The cooling liquid 432 then flows through the liquid-cooled grid resistors 512. The cooling liquid 432 is further heated by heat dissipated by the liquid-cooled grid resistors 512. The heated cooling liquid 432 is then circulated to the radiator 610, in which heat is dissipated from the cooling liquid 432. The operation of the integrated cooling system 600 is controlled by the control system 614.

Figure 7:
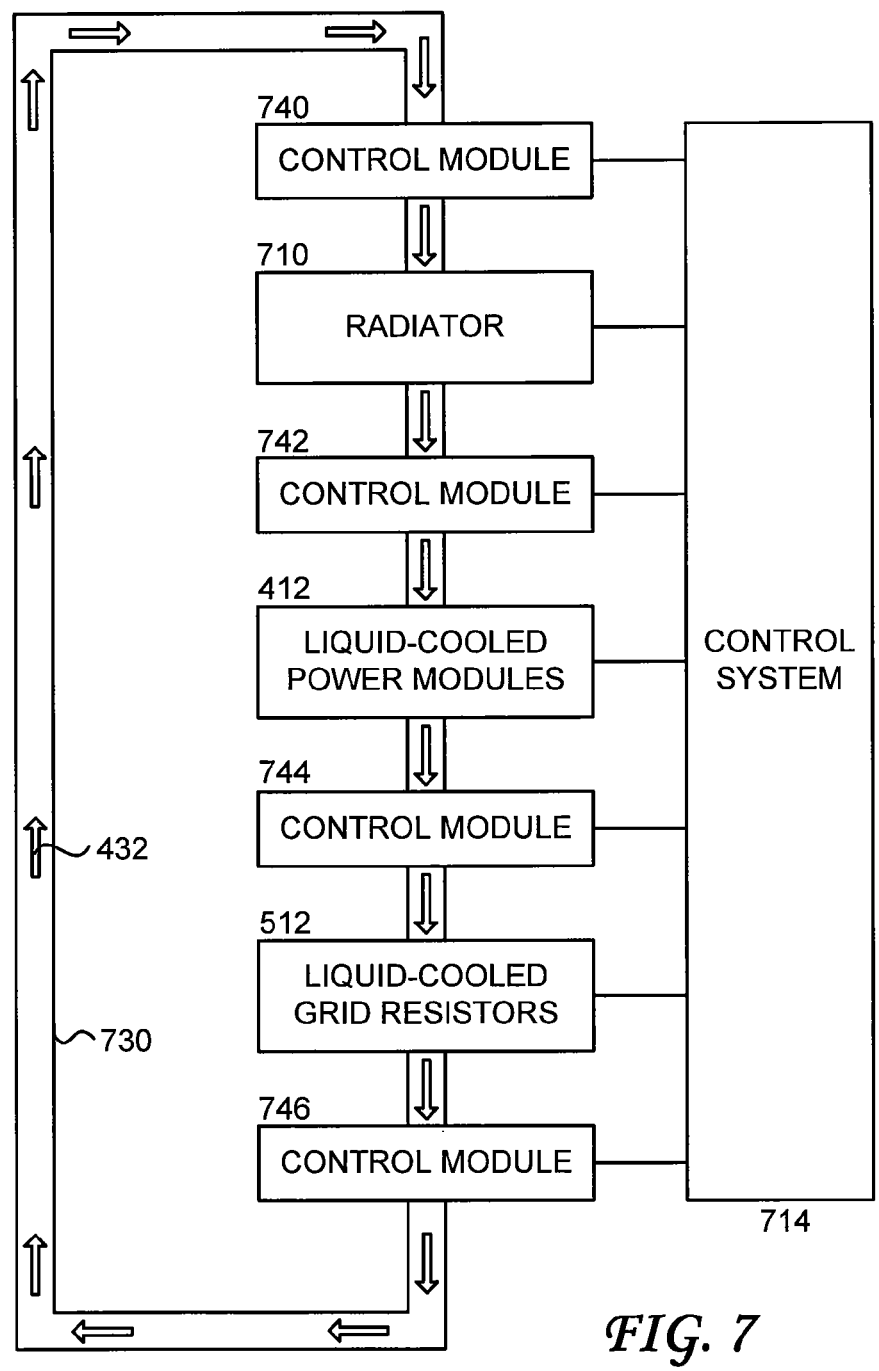
FIG. 7 shows a schematic of a second embodiment of an integrated liquid cooling system for power modules and grid resistors.

FIG. 7 shows a schematic of an integrated cooling system 700, in which control modules are included to provide more precise control. Details of the control modules are discussed below. The cooling liquid 432 circulates through the closed-cycle liquid distribution system 730. The cooling liquid 432 flows sequentially through the control module 742, the liquid-cooled power modules 412, the control module 744, the liquid-cooled grid resistors 512, the control module 746, the control module 740, and the radiator 710. The operation of the integrated cooling system 700 is controlled by the control system 714.

Figure 8:
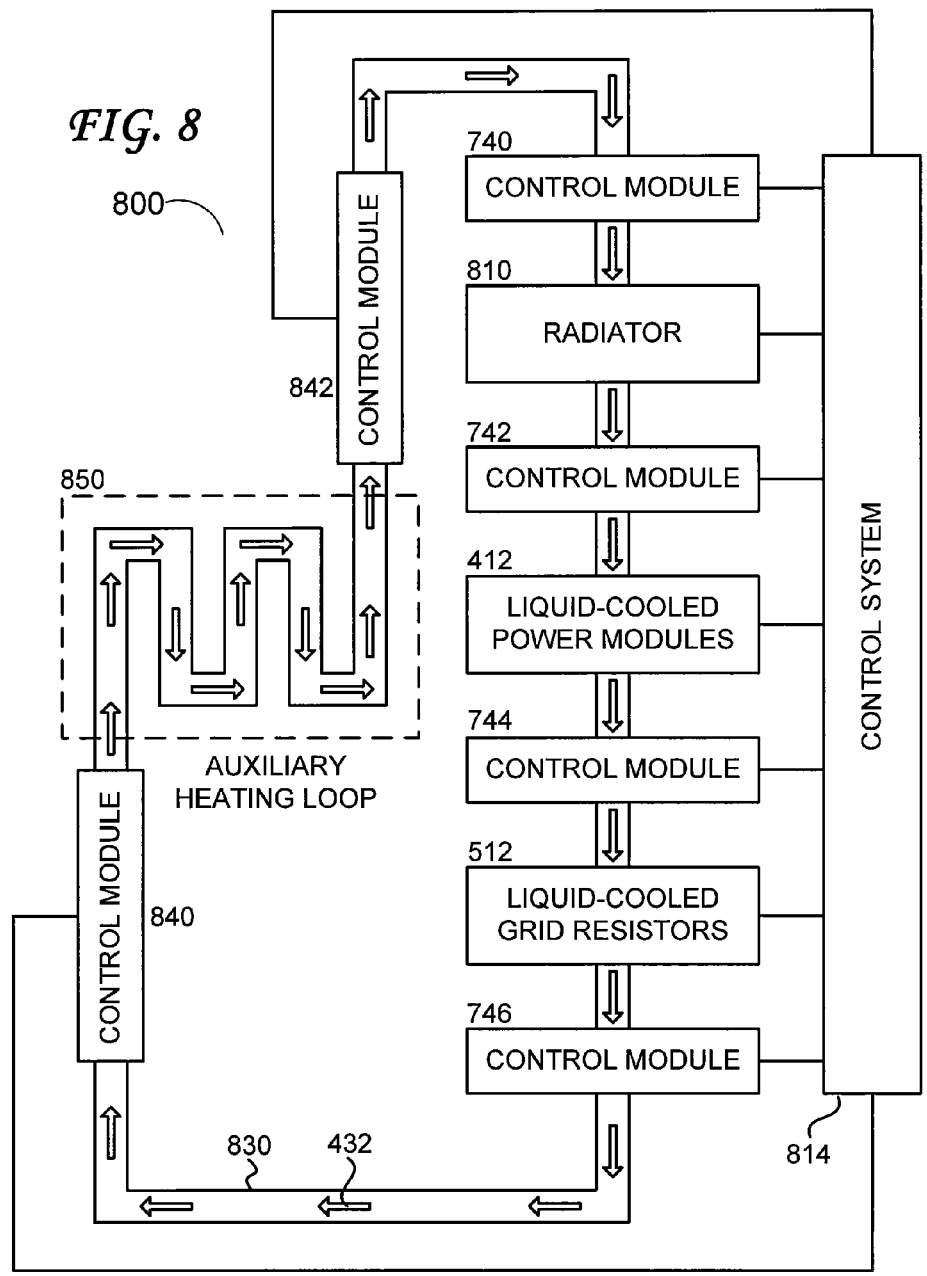
FIG. 8 shows a schematic of one embodiment of an integrated liquid cooling system with auxiliary heating bops.
Figure 9:
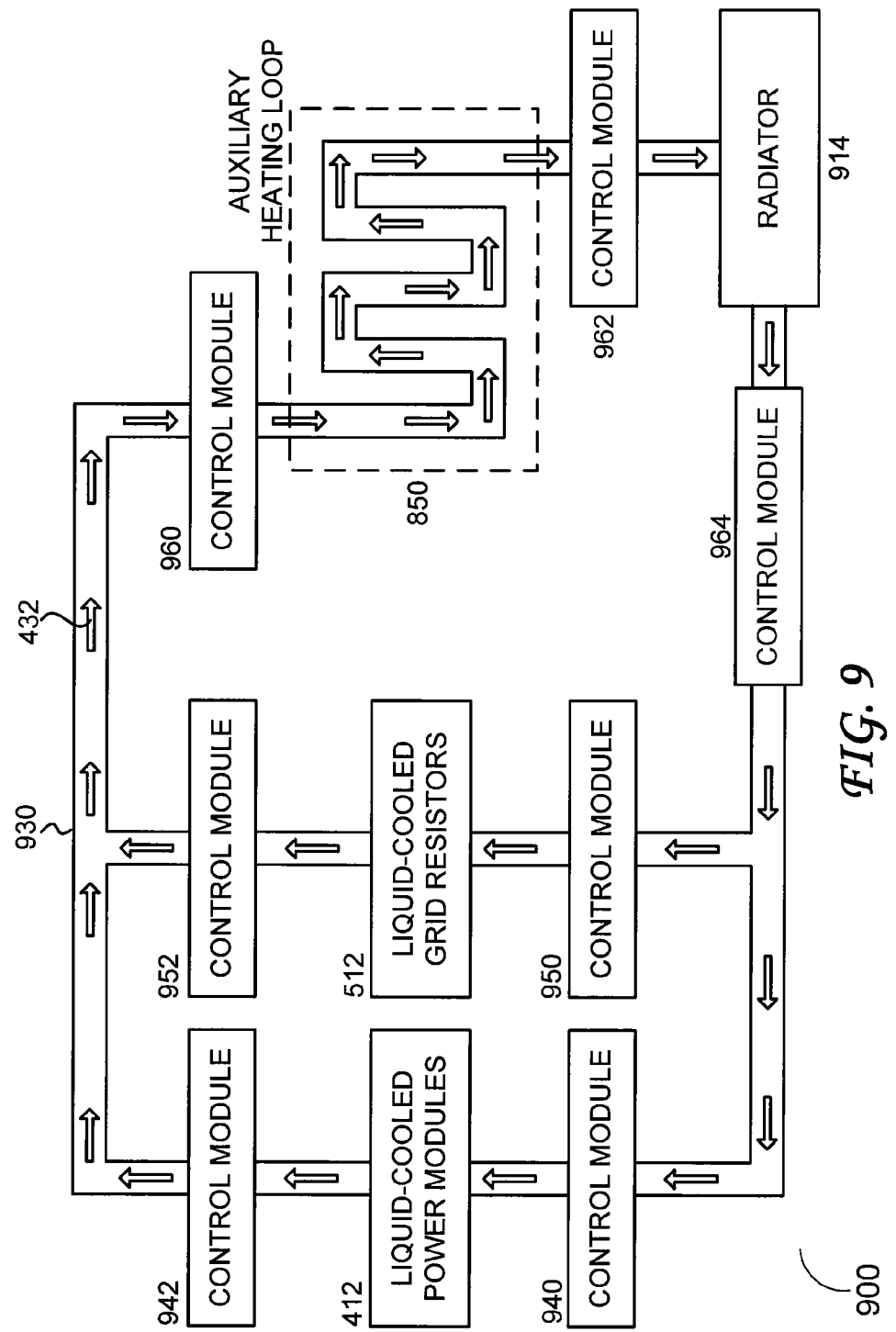
FIG. 9 shows a schematic of a second embodiment of an integrated liquid cooling system with auxiliary heating loops.

The control modules contain components such as temperature sensors, pressure sensors, flow sensors, and control valves. The control modules can further contain sensors to measure shock and vibration. In some embodiments, all the control modules are the same. In general, each control module can have different types and combinations of components. The number and placement of control modules in the cooling system can also vary. In FIG. 7-FIG. 9, control modules are shown schematically as independent functional blocks. In some embodiments, control modules are integrated with other functional components, such as radiators, liquid-cooled power modules, liquid-cooled grid resistors, and auxiliary heating loops (see below). Separate sensors measuring parameters such as temperature, shock, and vibration can also be installed at user-specified locations on the mining haul truck.

Mining vehicles often operate under harsh environmental conditions, including extreme shock, vibration, hear, and cold. Continuous vibration levels in the range of about 2 G (1 G=9.8 m/s$^2$) over a spectrum of about 10 Hz to about 500 Hz can be encountered. Ambient temperatures as low as −40 deg C can be encountered. At such low temperatures, metal and plastic components in the mining vehicle, including the body and the chassis, can become brittle and undergo mechanical failure. Fatigue failure is exacerbated by the high vibration levels.

In an embodiment, heat dissipated by the liquid-cooled power modules and the liquid-cooled grid resistors is used to warm portions of the mining vehicle to increase service life. The heat can also be used to warm the operator's cabin. Not only does the waste heat serve a useful purpose, but the load on the radiator is also reduced. Dependence on auxiliary electrical heaters is also reduced or eliminated, thereby conserving energy.

FIG. 8 shows a schematic of an integrated cooling system 800 similar to the one shown in FIG. 7. After the cooling liquid 432 has been heated by the liquid-cooled power modules 412 and the liquid-cooled grid resistors 512, however, it circulates through the control module 840, the auxiliary heating loop 850, and the control module 842. The auxiliary heating loop 850, for example, can be thermally anchored to portions of the body or the chassis of the mining vehicle. The auxiliary heating bop 850 can also serve as a radiator in the operator's cabin. Multiple heating loops can be configured. The radiator 810 can be sized differently from the radiator 710 in FIG. 7. The operation of the integrated cooling system 800 is controlled by the control system 814.

In the embodiments shown in FIG. 5-FIG. 8, the liquid distribution systems are configured as single serial loops. In general, the liquid distribution systems can be figured as various combinations of parallel and serial branches. FIG. 9 shows a schematic of an integrated cooling system 900 with two branches in parallel and one branch in series. To simplify the figure, the control system and associated connections are not shown.

The cooling liquid 432 circulates through the closed-cycle liquid distribution system 930. In the first parallel branch, the cooling liquid 432 flows through the control module 940, the liquid-cooled power modules 412, and the control module 942. In the second parallel branch, the cooling liquid 432 flows through the control module 950, the liquid-cooled grid resistors 512, and the control module 952. The cooling liquid heated by the liquid-cooled power modules 412 and the liquid-cooled grid resistors then flow serially through the control module 960, the auxiliary heating loop 850, the control module 962, the radiator 914, and the control module 964.

In general, the flow sequence of cooling liquid is user defined. For example, in one embodiment, the cooling liquid first flows through the liquid-cooled power modules and then through the liquid-cooled grid resistors; in another embodiment, the cooling liquid first flows through the liquid-cooled grid resistors and then through the liquid-cooled power modules.

In general, there can be multiple liquid-cooled power modules, multiple liquid-cooled grid resistors, multiple auxiliary heating loops, multiple control modules, multiple radiators, and multiple pumps. These components can be coupled by a liquid distribution system with various user-defined combinations of parallel and serial branches. In general, the temperature, pressure, and flow rate in each branch can be independently controlled.

Grid resistors operate over a range of service temperatures specified by the manufacturer. The range is specified by a low-temperature limit and a high-temperature limit. The cooling system is designed to prevent the operating temperature of the grid resistors from exceeding the high-temperature limit. Special procedures are required when the ambient temperature is less than the low-temperature limit. The electrical motors in the milling haul truck operate in propel (drive) intervals and retard (braking) intervals. During a retard interval, grid resistors are heated by the braking current flowing through them. When the mining haul truck is not braking, however, the temperature of the grid resistors can drop to the ambient temperature. At extreme low temperatures, air-cooled grid resistors are heated by an external heater. In an embodiment, liquid-cooled grid resistors are heated by maintaining a heating current through them.

Figure 10:
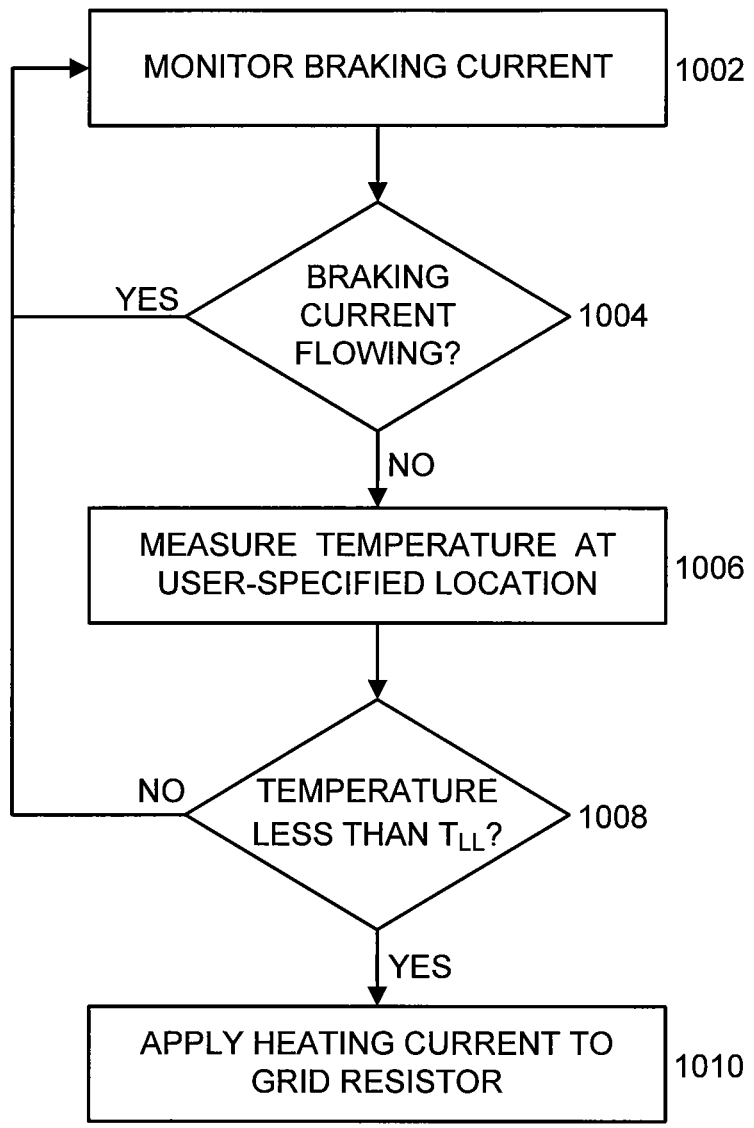
FIG. 10 shows a flowchart of a method for operating liquid-cooled grid resistors under low temperatures.

FIG. 10 shows a flowchart of steps for a method of operating liquid-cooled grid resistors under extreme low temperatures, according to an embodiment. In step 1002, the state of the electrical motor is monitored to determine whether it is operating in a retard interval. For example, the braking current through a grid resistor is monitored. The process then passes to decision step 1004. If the electrical motor is operating in a retard interval (braking current is flowing through the grid resistor), then the process returns to step 1002, and the braking current continues to be monitored. If the electrical motor is not operating in a retard interval (braking current is not flowing through the grid resistor), then the process passes to step 1006, in which the temperature at a user-specified location is measured. The temperature at the user-specified location can, for example, be the ambient air temperature, the temperature at the body of the grid resistor, or the temperature at a control module.

The process then passes to decision step 1008. If the measured temperature is not less than a predetermined, user-specified low temperature limit $T_{LL}$, then the process returns to step 1002, and the braking current continues to be monitored. If the measured temperature is less than the predetermined, user-specified low temperature limit $T_{LL}$, then the process passes to step 1010, in which a heating current is applied through the grid resistor. The value of the heating current can be a predetermined fixed value or a value that is a function of the difference between the measured temperature and $T_{LL}$. In an embodiment, the temperature at the body of the grid resistor is measured, and the value of the heating current is controlled to maintain the temperature within a predetermined, user-specified temperature range.

Figure 11:
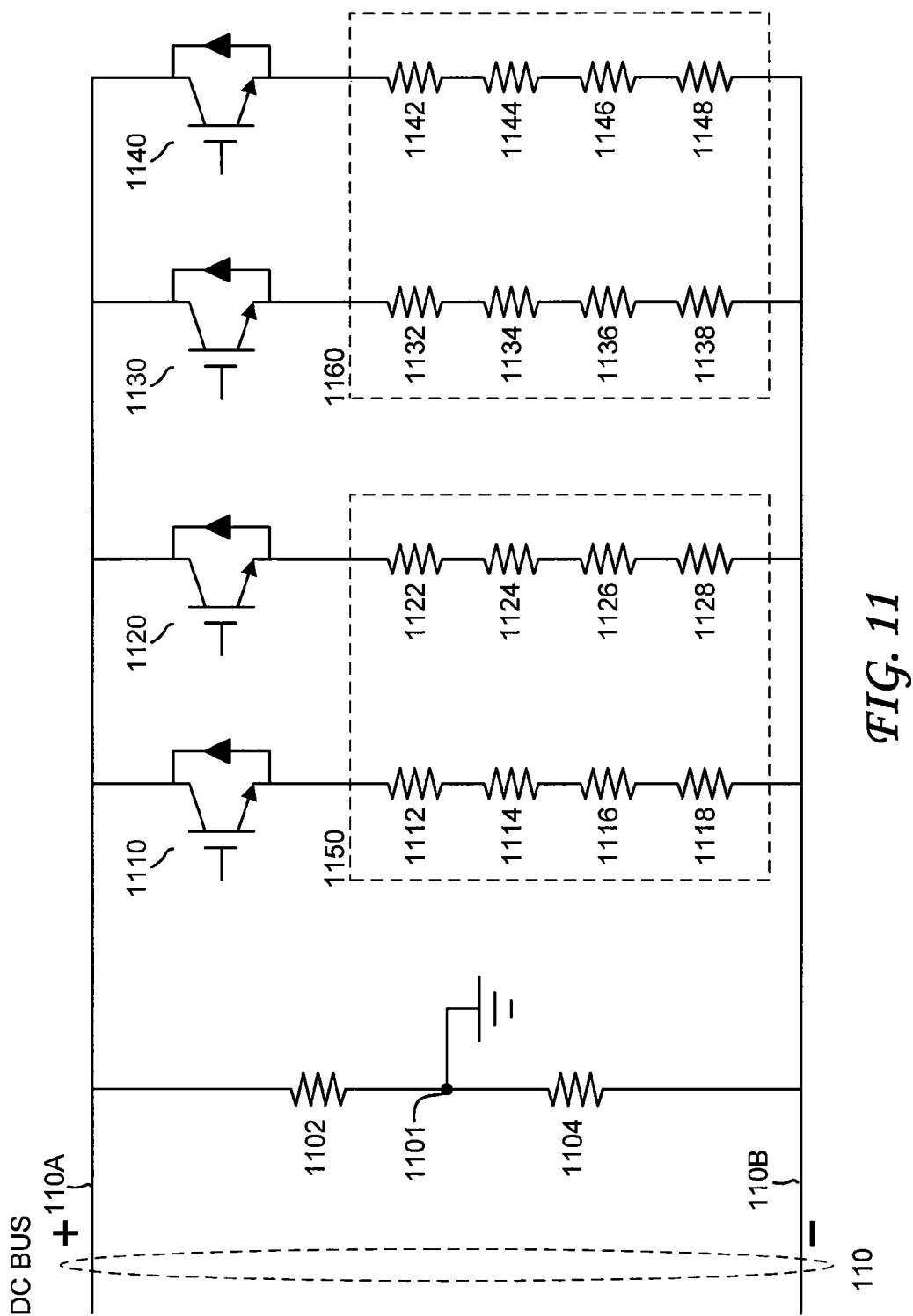
FIG. 11 shows a schematic of a power resistor grid circuit for liquid-cooled grid resistors.

To implement liquid-cooled grid resistors for mining vehicles, the electrical circuitry is also reconfigured from the prior-art electrical circuitry (FIG. 2). As discussed above, the voltage across the DC bus 110 is about 1800 VDC for mining equipment. The insulation rating for typical liquid-cooled grid resistors, however, is about 1000 VDC. FIG. 11 shows modified electrical circuitry. Resistor 1102 and resistor 1104 are placed across the positive rail 110A and the negative rail 110E of the DC bus 110. The center tap 1101 is grounded. Ground fault detection and protection circuits (not shown) can also be installed between the center tap 1101 and ground. In the event of a ground fault, the maximum magnitude of the voltage difference from ground will be about 900 VDC, which is safely within the insulation rating of a liquid-cooled grid resistor. In general, if the insulation rating of a liquid-cooled grid resistor is $V_{INS}$, the potentials are configured such that the maximum magnitude of the voltage difference from ground is less than or equal to $V_{INS}$.

In the embodiment shown in FIG. 11, four DC choppers are used. Each DC chopper is connected to a series of four grid resistors (R). DC chopper 1110 is connected to R 1112, R 1114, R 1116, and R 1118; DC chopper 1120 is connected to R 1122, R 1124, R 1126, and R 1128; DC chopper 1130 is connected to R 1132, R 1134, R 1136, and R 1138; and DC chopper 1140 is connected to R 1142, R 1144, R 1146, and R 1148. The power resistor grid 1150 (R 1112-R 1118 and R 1122-R 1128) dissipate the braking energy from the first wheel motor (as discussed above in reference to FIG. 1). The power resistor grid 1160 (R 1132-R 1138 and R 1142-R 1148) dissipate the braking energy from the second wheel motor. In general, the number of DC choppers, the number of resistors in series with each DC chopper, the resistance value of each resistor, the power rating of each DC chopper, and the power rating of each resistor are user-defined values that depend on various design parameters such as the amount of regeneration power and the haul truck payload.

Figure 12:
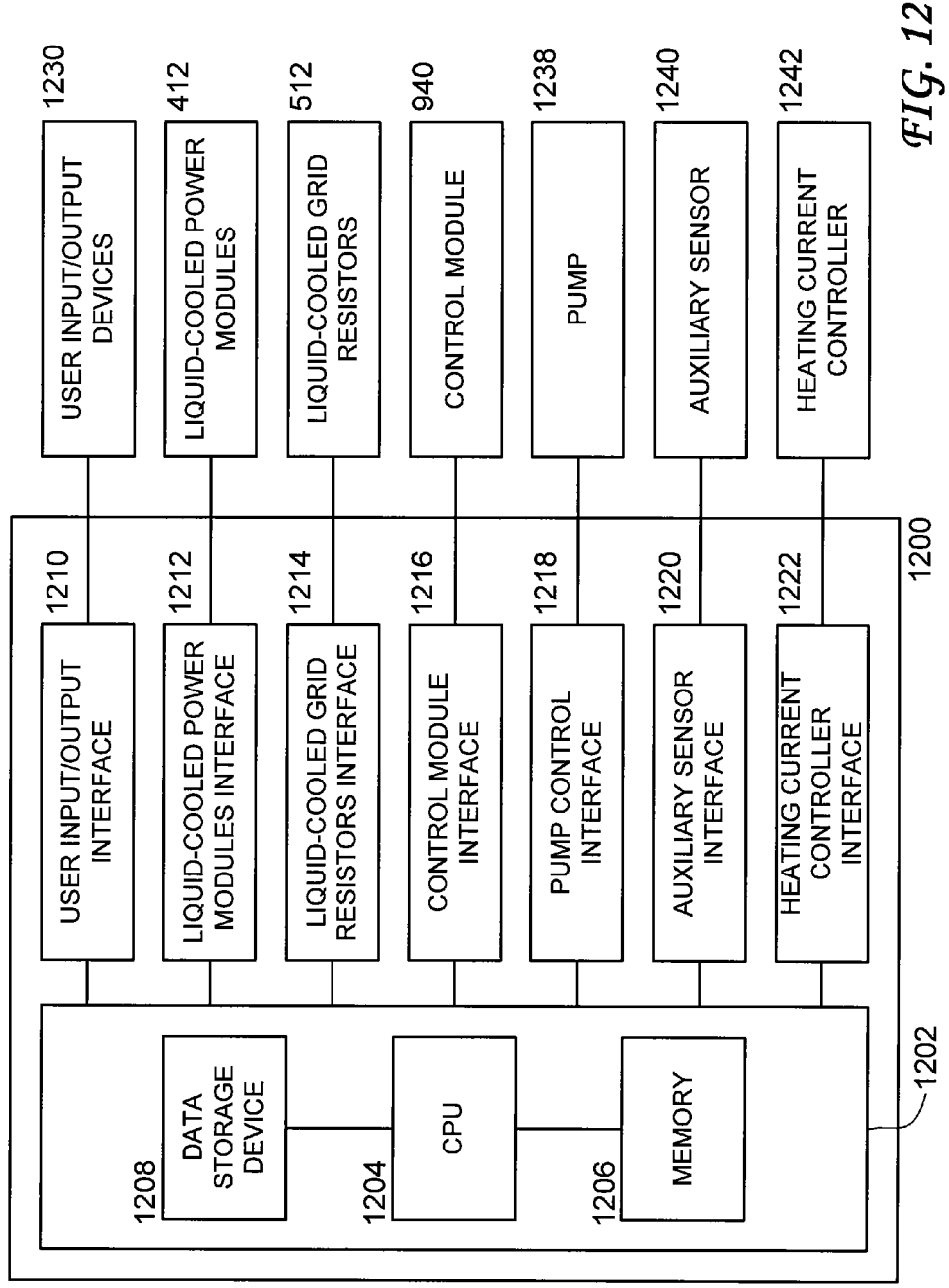
FIG. 12 shows a schematic of a computational system configured to control an integrated liquid cooling system.

An embodiment of a computational system 1200 for implementing a control system for liquid-cooled grid resistors is shown in FIG. 12. The computational system 1200, for example, can be installed in the cabin of a mining haul truck. One skilled in the art can construct the computational system 1200 from various combinations of hardware, firmware, and software. One skilled in the art can construct the computational system 1200 from various electronic components, including one or more general purpose microprocessors, one or more digital signal processors, one or more application-specific integrated circuits (ASICs), and one or more field-programmable gate arrays (FPGAs).

The computational system 1200 includes a computer 1202, which includes a central processing unit (CPU) 1204, memory 1206, and a data storage device 1208. The data storage device 1208 includes at least one persistent, non-transitory, tangible computer readable medium, such as non-volatile semiconductor memory, a magnetic hard drive, or a compact disc read only memory.

The computational system 1200 can further include a user input/output interface 1210, which interfaces computer 1202 to user input/output devices 1230. Examples of user input/output devices 1230 include a keyboard, a mouse, a local access terminal, and a video display. Data, including computer executable code, can be transferred to and from the computer 1202 via the user input/output interface 1210.

The computational system 1200 can further include a liquid-cooled power modules interface 1212, which interfaces the computer 1202 with the liquid-cooled power modules 412.

The computational system 1200 can further include a liquid-cooled grid resistors interface 1214, which interfaces the computer 1202 with the liquid-cooled grid resistors 512.

The computational system 1200 can further include a control module interface 1216, which interfaces the computer 1202 with the control module 940.

The computational system 1200 can further include a pump control interface 1218, which interfaces the computer 1202 with a pump 1238.

The computational system 1200 can further include an auxiliary sensor interface 1220, which interfaces the computer 1202 with an auxiliary sensor 1240. Examples of the auxiliary sensor 1240 include a temperature sensor that measures the ambient air temperature and a temperature sensor that measures the temperature of the body of a grid resistor. In some embodiments, a temperature sensor interfaces with a temperature measurement unit that communicates with the computational system 1200 via a communications interface.

The computational system 1200 can further include a heating current controller interface 1222, which interfaces the computer 1202 with a heating current controller 1242. The heating current controller 1242 is used to control heating current through a grid resistor under extreme low ambient temperatures (see discussion above with reference to FIG. 10).

The computational system 1200 can include one or more of each of the above interfaces. The computational system 1200 can further include other interfaces (not shown); for example, a communications network interface can interface the computer 1202 with a communications network. Examples of a communications network include a local area network and a wide area network. A user can access the computer 1202 via a remote access terminal (not shown) communicating with the communications network. Data, including computer executable code, can be transferred to and from the computer 1202 via the communications network interface.

Each of the interfaces described above can operate over different media. Examples of media include wires, optical fibers, free-space optics, and electromagnetic waves (typically in the radiofrequency range and commonly referred to as a wireless interface).

As is well known, a computer operates under control of computer software, which defines the overall operation of the computer and applications. The CPU 1204 controls the overall operation of the computer and applications by executing computer program instructions that define the overall operation and applications. The computer program instructions can be stored in the data storage device 1208 and loaded into the memory 1206 when execution of the program instructions is desired. Control algorithms can be defined by computer program instructions stored in the memory 1206 or in the data storage device 1208 (or in a combination of the memory 1206 and the data storage device 1208) and controlled by the CPU 1204 executing the computer program instructions. For example, the computer program instructions can be implemented as computer executable code programmed by one skilled in the art to perform control algorithms, such as control algorithms to control the pressure, flow rate, and temperature of cooling liquid through specific components and control algorithms to maintain proper operation of grid resistors under extremely low ambient temperatures (as discussed above in reference to FIG. 10). Accordingly, by executing the computer program instructions, the CPU 1204 executes control algorithms.

Although electrically powered mining vehicles have been used in the above examples, one skilled in the art can develop embodiments of the invention for non-mobile electrically powered mining equipment, such as mills and conveyor systems. For electrically powered mining equipment, cooling the grid resistors with liquid instead of air has a number of advantages:

- The fans are eliminated. Less space is required, and noise is substantially reduced. For mining haul trucks, payload is substantially increased.
- The cooling capacity is increased. For a particular power load, liquid-cooled grid resistors can occupy a smaller footprint than air-cooled grid resistors. Alternatively, for the same footprint, liquid-cooled grid resistors can handle a higher power load than air-cooled grid resistors. Higher braking capacity through the grid resistors results in less wear to the mechanical brakes.
- Circulating cooling liquid through each grid resistor instead of blowing air across a resistor grid provides a more uniform cooling of each grid resistor. Consequently, the service life of the grid resistors is increased.

Liquid cooling of the grid resistors can be integrated with liquid cooling of the power modules. A single control system can control an integrated cooling system.

Heat dissipated from the grid resistors and power modules can be distributed to keep particular portions of the mining equipment warm when the ambient temperature is low.

Although liquid-cooled braking resistors have been used in other applications (such as elevators, buses, and trains), mining applications present particularly harsh demands:

In mining applications, the braking power is typically ~4 MW. In other applications, the braking power is typically less than ~800 kW.

In mining applications, the DC link voltage is typically ~1800 VDC. In other applications, the DC link voltage is typically less than ~1000 VDC. Standard liquid-cooled braking resistors typically have insulation rated for up to only 1000 VDC.

In mining applications, the braking resistors need to be rated for operation in ambient temperatures as low as −40 deg C. Standard liquid-cooled braking resistors typically can operate down to only −25 deg C.

In mining operations, the braking resistors are exposed to higher levels of shock and vibration than in other applications. For example, a mining haul truck carrying a payload of about 360 ton or more over uneven terrain can expose braking resistors to continuous vibrations on the order of 2 G (1 G=9.8 m/s$^2$) over a spectrum of about 10 Hz to about 500 Hz. High shock and vibration can lead to premature failure of the braking resistors.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A heat distribution system for mining equipment, wherein the mining equipment comprises an electrical motor and the electrical motor is configured to operate in at least one propel interval and in at least one retard interval, the heat distribution system comprising:
    a braking resistor;
    a power module;
    a control unit configured to:
        determine whether the electrical motor is operating in a retard interval; and
        upon determining that the electrical motor is operating in a retard interval: switch a braking current generated by the electrical motor through the braking resistor; and
    a liquid distribution system configured to transfer heat from the braking resistor to a cooling liquid, the liquid distribution system being further configured to transfer heat generated by the power module to the cooling liquid.

2. The heat distribution system of claim 1, further comprising:
    a temperature measurement unit; and
    a heating current source;
    wherein the control unit is further configured to:
        upon determining that the electrical motor is not operating in a retard interval:
        receive a measured temperature from the temperature measurement unit;
        compare the measured temperature to a predetermined temperature limit; and
        upon determining that the measured temperature is less than the predetermined temperature limit:
        switch a heating current from the heating current source through the braking resistor.

3. The heat distribution system of claim 2, wherein:
    the temperature measurement unit is configured to measure the ambient temperature; and
    the predetermined temperature limit is about −40 deg C.

4. The heat distribution system of claim 1, wherein the liquid distribution system comprises an auxiliary heating loop configured to transfer heat from the cooling liquid to a portion of the mining equipment.

5. The heat distribution system of claim 4, wherein the mining equipment comprises a mining vehicle and the portion of the mining equipment comprises one of:
    a body of the mining vehicle;
    a chassis of the mining vehicle; or
    an operator's cabin of the mining vehicle.

6. The heat distribution system of claim 1, wherein the liquid distribution system comprises at least one pump configured to circulate the cooling liquid.

7. The heat distribution system of claim 1, wherein the liquid distribution system comprises at least one of:
    a temperature sensor configured to measure a temperature of the cooling liquid;
    a flow sensor configured to measure a flow rate of the cooling liquid; or
    a pressure sensor configured to measure a pressure of the cooling liquid.

8. The heat distribution system of claim 1, wherein the cooling liquid comprises water.

9. The heat distribution system of claim 1, wherein the liquid distribution system comprises a plurality of branches.

10. The heat distribution system of claim 1, wherein the power module is configured to be powered by a direct current bus comprising a positive rail and a negative rail, wherein:
    the magnitude of the voltage difference across the positive rail and the negative rail is about 1800 VDC to about 2000 VDC; and
    the magnitude of the voltage between any point on the direct current bus with respect to ground is less than or equal to about 1000 VDC.

11. The heat distribution system of claim 1, wherein the braking resistor is one of a plurality of braking resistors and the plurality of braking resistors is configured to dissipate at least about 4 megawatts.

12. The heat distribution system of claim 1, wherein the braking resistor is configured to operate under an ambient temperature as low as about −40 deg C.

13. The heat distribution system of claim 1, wherein the braking resistor is configured to operate under a continuous vibration of about 2 G over a spectrum of about 10 Hz to about 500 Hz.

* * * * *